US010323928B2

(12) United States Patent
Sesko

(10) Patent No.: US 10,323,928 B2
(45) Date of Patent: Jun. 18, 2019

(54) OPTICAL CONFIGURATION FOR MEASUREMENT DEVICE USING EMITTER MATERIAL CONFIGURATION

(71) Applicant: Mitutoyo Corporation, Kanagawa-ken (JP)

(72) Inventor: David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 200 days.

(21) Appl. No.: 15/625,879

(22) Filed: Jun. 16, 2017

(65) Prior Publication Data

US 2018/0364026 A1 Dec. 20, 2018

(51) Int. Cl.
*G01B 11/14* (2006.01)
*G01B 11/00* (2006.01)
*G01B 5/012* (2006.01)

(52) U.S. Cl.
CPC .......... *G01B 11/007* (2013.01); *G01B 5/012* (2013.01)

(58) Field of Classification Search
CPC ..... G01B 11/026; G01B 11/002; G01B 11/14; G01S 5/163; G01S 5/16
USPC ........................................................ 356/614
See application file for complete search history.

(56) References Cited

U.S. PATENT DOCUMENTS

| 5,509,211 A | 4/1996 | Ernst |
| 5,552,883 A | 9/1996 | Busch-Vishniac et al. |
| 6,971,183 B2 | 12/2005 | Brenner et al. |
| 7,652,275 B2 | 1/2010 | Gladnick |
| 8,438,746 B2 | 5/2013 | Usui |
| 2005/0000102 A1 | 1/2005 | Christoph et al. |
| 2013/0212891 A1 | 8/2013 | Mariller et al. |
| 2013/0222772 A1 | 8/2013 | Matsubara |
| 2016/0258733 A1 | 9/2016 | Shimaoka et al. |

(Continued)

FOREIGN PATENT DOCUMENTS

JP  8-233521 A  9/1996

OTHER PUBLICATIONS

Harsila et al., "Measurement Device With Multiplexed Position Signals," U.S. Appl. No. 14/973,376, filed Dec. 17, 2015, 50 pages.

(Continued)

*Primary Examiner* — Md M Rahman
(74) *Attorney, Agent, or Firm* — Seed IP Law Group LLP

(57) ABSTRACT

A scanning probe responsive in three axes is provided for use in a coordinate measuring machine. The scanning probe includes a frame, a stylus suspension portion and a stylus position detection portion. The stylus position detection portion includes a light source that is operated to radiate source light toward a position indicating element that is fixed relative to the stylus coupling portion. The position indicating element includes a position indicating emitter having an emitter material (e.g., phosphor) that inputs and absorbs the light from the light source and responds by outputting excitation light. In various implementations, the excitation light is directed as at least one of axial measurement light along an axial measurement spot path to form an axial measurement spot on an axial position sensitive detector and/or rotary measurement light along a rotary measurement spot path to form a rotary measurement spot on a rotary position sensitive detector.

26 Claims, 11 Drawing Sheets

(56) References Cited

U.S. PATENT DOCUMENTS

2016/0370172 A1 12/2016 Christoph et al.
2017/0017091 A1 1/2017 Lee et al.

OTHER PUBLICATIONS

Sesko, "Optical Configuration for Measurement Device," U.S. Appl. No. 14/973,431, filed Dec. 17, 2015, 43 pages.
Sesko, "Optical Configuration for Measurement Device Using Emitter Material Configuration With Quadrant Photodetectors," U.S. Appl. No. 15/625,835, filed Jun. 16, 2017, 64 pages.
Extended European Search Report, dated Sep. 21, 2018, for European Application No. 18178083.4-1022, 15 pages.

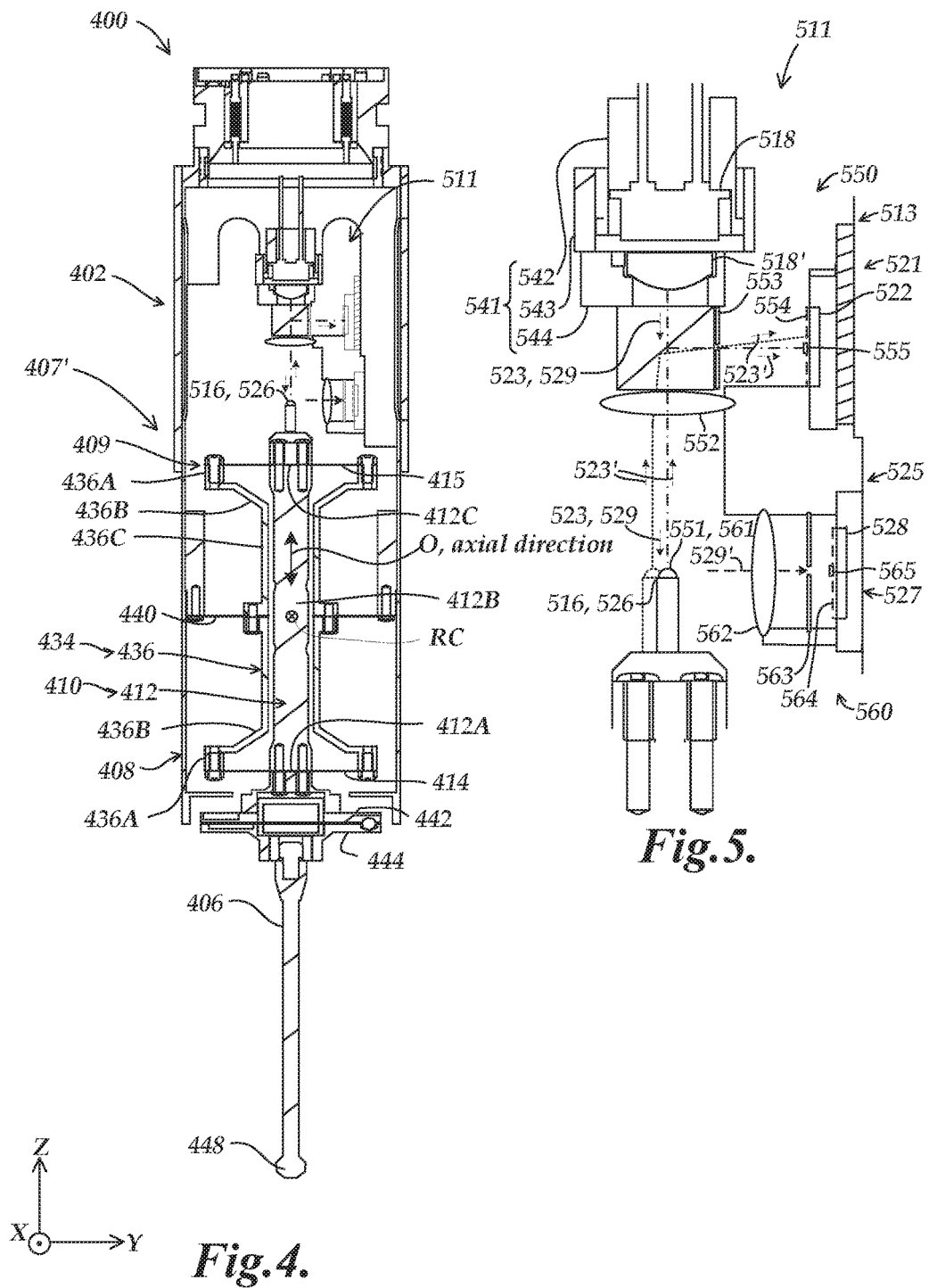

OPTICAL CONFIGURATION FOR MEASUREMENT DEVICE USING EMITTER MATERIAL CONFIGURATION

BACKGROUND

Technical Field

This disclosure relates to precision metrology and, more particularly, to sensing configurations in probes used with coordinate measuring machines.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183 (the '183 patent), which is hereby incorporated herein by reference in its entirety. The probe disclosed therein includes a stylus having a surface contact portion, an axial motion mechanism and a rotary motion mechanism. The axial motion mechanism includes a moving member that allows the contact portion to move in a central axis direction (also referred to as a Z direction or an axial direction) of the measuring probe. The rotary motion mechanism includes a rotating member that allows the contact portion to move perpendicular to the Z direction. The axial motion mechanism is nested inside the rotary motion mechanism. The contact portion location and/or workpiece surface coordinates are determined based on the displacement of the rotating member and the axial displacement of the axial motion moving member.

Motion mechanisms and/or conventional displacement detector arrangements such as those disclosed in the '183 patent may be relatively expensive and/or susceptible to various "cross coupling" errors (e.g., due to the general configuration and/or mechanism and/or detector imperfections, etc.) Other issues with such configurations may include non-linearities that are inherent in the response of the system (e.g., due to moving optical elements), position errors resulting from a movement of a light source that is utilized, etc. A need exists for an improved sensing configuration in a probe (e.g., wherein the displacement detector configurations may be less susceptible to errors such as those noted above and/or may be relatively less expensive, etc.)

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanning probe responsive in three axes is provided for use in a measuring machine (e.g., a CMM). The scanning probe includes a frame, a stylus suspension portion and a stylus position detection portion. The stylus suspension portion is attached to the frame and includes a stylus coupling portion that is configured to be rigidly coupled to a stylus, and a stylus motion mechanism that is configured to enable axial motion of the stylus coupling portion along an axial direction, and rotary motion of the stylus coupling portion about a rotation center. The stylus position detection portion includes a first position sensitive detector, a first light source and a first position indicating element.

The first position sensitive detector is fixed relative to the frame and comprises a first photodetector configured to provide an output that is responsive to the position of a first measurement spot along a first sensing axis direction of the first position sensitive detector. In various implementations, the first position sensitive detector is at least one of an axial position sensitive detector or a rotary position sensitive detector. The first light source is fixed relative to the frame and is configured to radiate first source light comprising a first wavelength range along a first source light path. The first position indicating element is fixed relative to the stylus coupling portion and moves with the stylus coupling portion.

The first position indicating element comprises a first position indicating emitter including an emitter material that inputs the light in the first wavelength range from the first light source and responds by outputting excitation light generated within the emitter material. In various implementations, the generated excitation light comprises a second wavelength range not included in the first wavelength range. The first position indicating emitter is configured to input the first source light along the first source light path regardless of the position of the stylus coupling portion within its motion range, and to output the generated excitation light as first measurement light along a first measurement spot path to form a first measurement spot on the first position sensitive detector. The first position sensitive detector outputs a first signal in response to the first measurement spot, wherein the first signal is indicative of at least one of an axial or rotary position of the stylus coupling portion.

BRIEF DESCRIPTION OF THE DRAWINGS

FIG. 4 is a diagram showing a cross section of one implementation of the stylus suspension portion of FIG. 3 as included within a main body frame of a scanning probe;

FIG. 5 is a diagram showing a second exemplary implementation of a stylus position detection portion as included in the scanning probe of FIG. 4;

DETAILED DESCRIPTION

Figure 1:
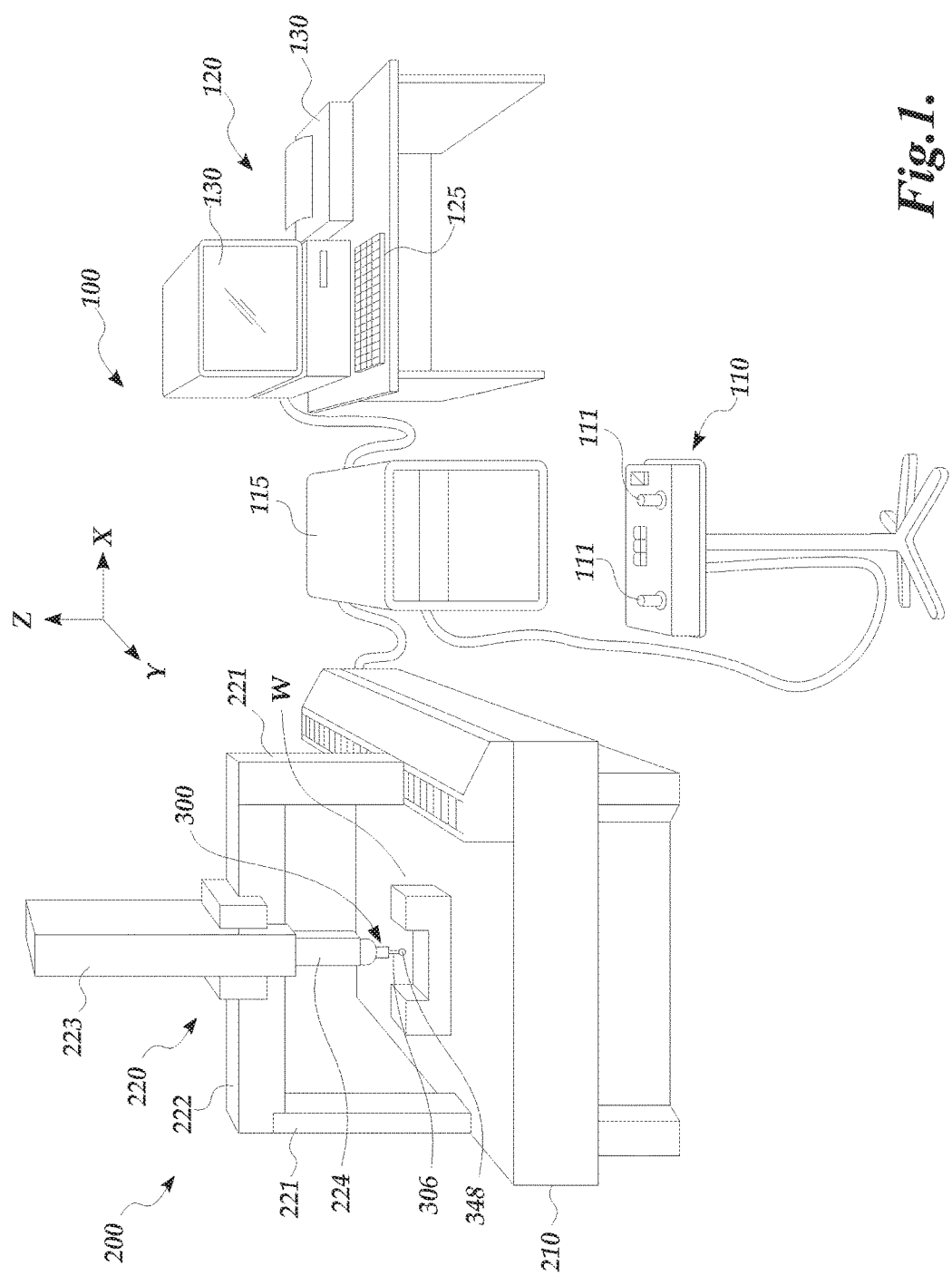
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, the CMM 200, a motion controller 115 that controls movements of the CMM 200, and a host computer 120. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and an attachment portion 224 for attaching the scanning probe 300 to the drive mechanism 220. The drive mechanism 220 includes x-axis, y-axis, and z-axis slide mechanisms 222, 221, and 223, respectively, for moving the scanning probe 300 three-dimensionally. A stylus 306 attached to the end of the scanning probe 300 includes a contact portion 348. As will be described in more detail below, the stylus 306 is attached to a stylus suspension portion of the scanning probe 300, which allows the contact portion 348 to freely change its position in three directions when the contact portion 348 moves along a measurement path on the surface of the workpiece W.

Figure 2:
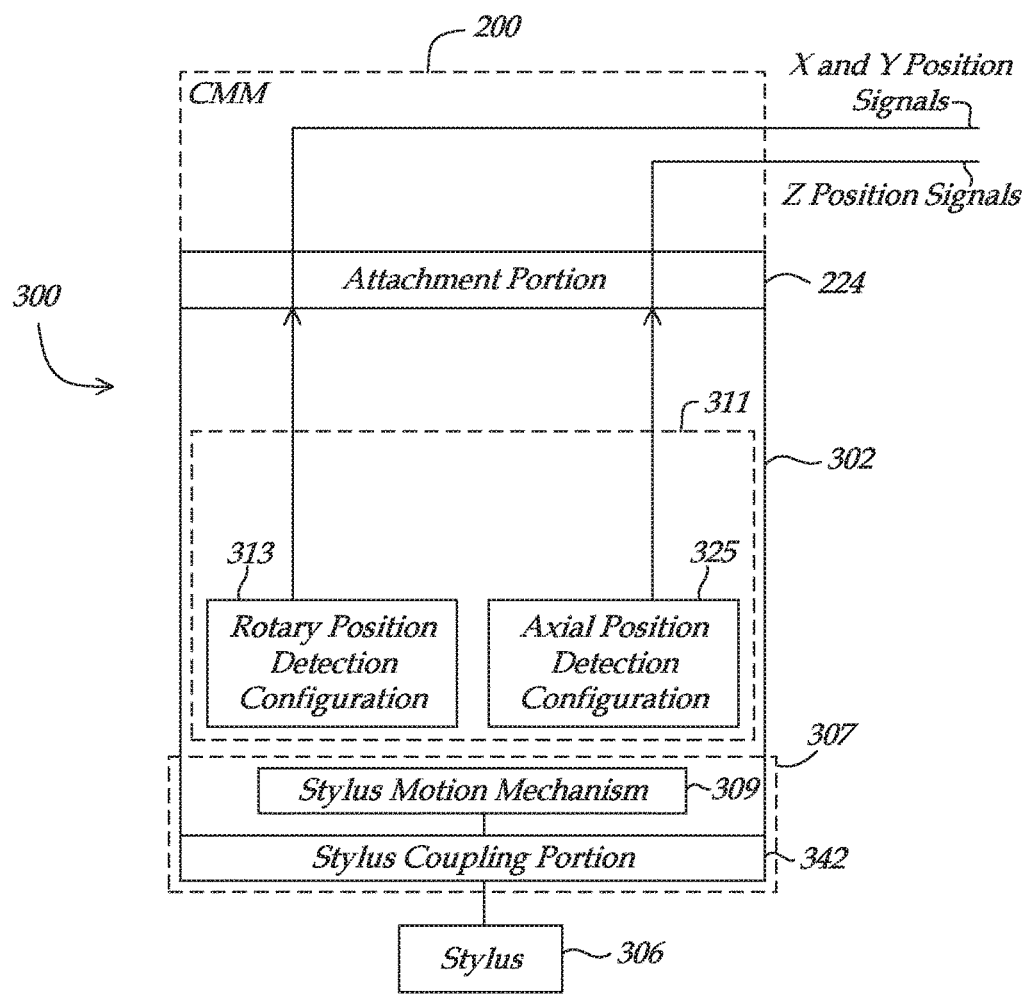
FIG. 2 is a block diagram showing various elements of a scanning probe as coupled to a CMM and providing X, Y and Z position signals.

FIG. 2 is a block diagram showing various elements of a scanning probe 300 as coupled to a CMM 200 and providing X, Y and Z position signals. The scanning probe 300 includes a probe main body 302 (e.g., comprising a frame) which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4.

As shown in FIG. 2, the stylus position detection portion 311 includes a rotary position detection configuration 313 and an axial position detection configuration 325. The rotary position detection configuration 313 outputs at least first and second rotary signals (e.g., X and Y position signals) that are indicative of the rotary position of the stylus coupling portion 342. The axial position detection configuration 325 outputs at least one axial signal (e.g., a Z position signal) that is indicative of the axial position of the stylus coupling portion 342 along the axial direction. In various implementations, one or more receiving portions (e.g., in the CMM 200, motion controller 115, host computer 120, etc.) may receive the X, Y and Z position signals and one or more associated processing portions may be utilized to determine a 3D position of the stylus coupling portion 342 and/or of the contact portion of the attached stylus 306 as the contact portion moves along a surface of a workpiece W that is being measured.

Figure 3:
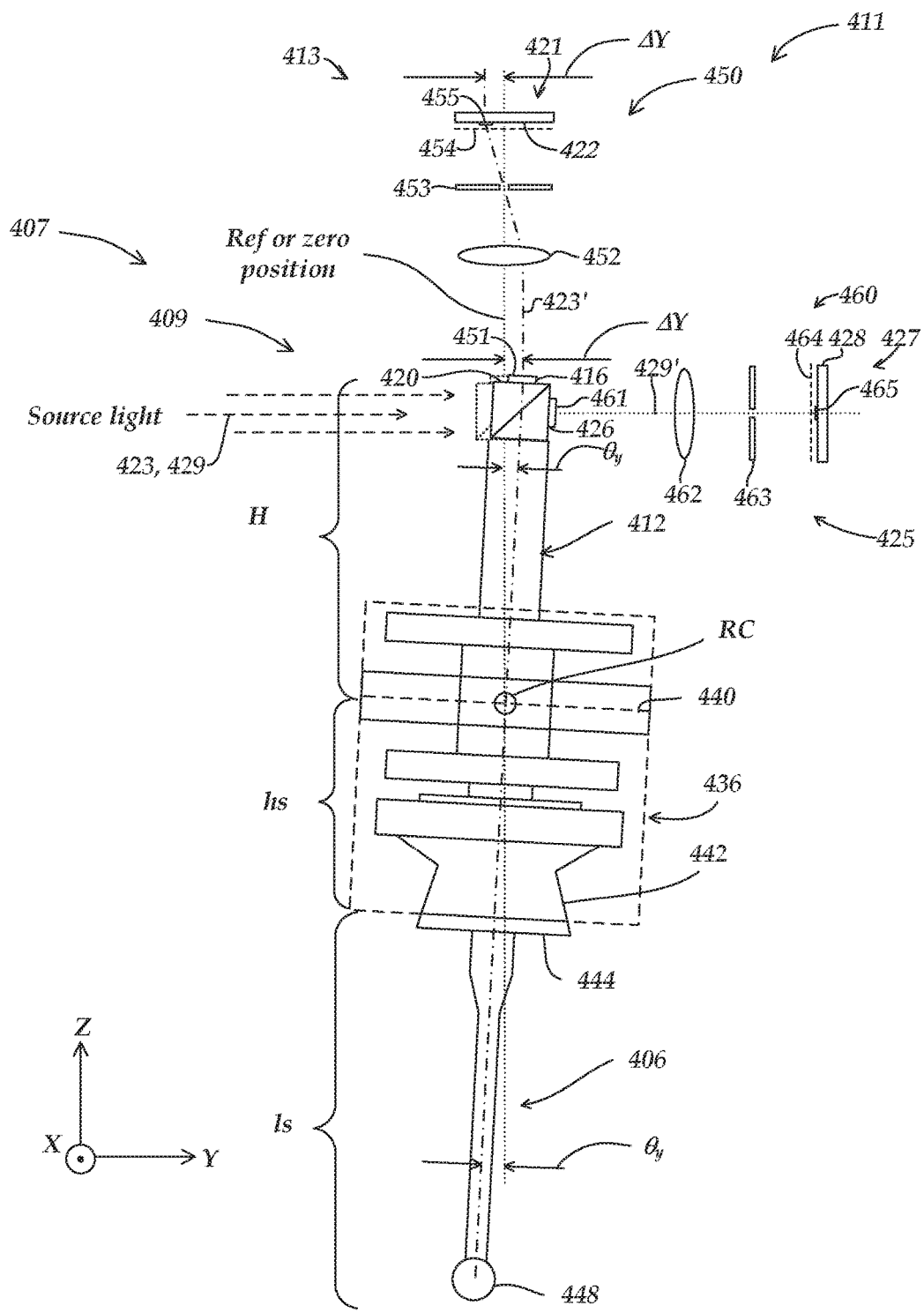
FIG. 3 is a diagram showing portions of a first exemplary implementation of a stylus suspension portion as coupled to a stylus and a first exemplary implementation of a stylus position detection portion for detecting the position of the stylus suspension portion.

FIG. 3 is a diagram showing portions of a first exemplary implementation of a schematically/partially represented stylus suspension portion 407 as coupled to a stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-11B. As shown in FIG. 3, the stylus suspension portion 407 includes a stylus motion mechanism 409 and a stylus coupling portion 442. The stylus coupling portion 442 is configured to be rigidly coupled to a stylus 406 which has a contact portion 448 for contacting a surface S of a workpiece W (not shown).

As will be described in more detail below with respect to FIG. 4, the stylus motion mechanism 409 is configured to enable axial and rotary motion of the stylus coupling portion 442 and attached stylus 406 so that the contact portion 448 can change its position in three directions along the shape of the surface S. For purposes of illustration, the vertical and horizontal directions on the plane of paper in FIG. 3 are defined as Z and Y directions, respectively, and the perpendicular direction to the plane of the paper is defined as the X direction. The direction of a central axis O (axial direction O) of the measuring probe 300 coincides with the Z direction in this illustration.

In FIG. 3, rotary motion portions of the stylus motion mechanism 409 are illustrated, including a rotating member 436 (which is also referenced as a rotating member RP), a flexure element 440, and a moving member 412 disposed within the rotating member 436. As will be described in more detail below with respect to FIG. 4, the flexure element 440 enables rotary motion of the rotating member 436 about a rotation center RC. As will also be described in more detail below, in various implementations a rotary photodetector 422 is able to sense the rotated position of the moving member 412 in X and Y directions, and an axial photodetector 428 is able to sense the axial position of the moving member 412 in the Z direction.

As shown in FIG. 3, a first exemplary implementation of a stylus position detection portion 411 includes a rotary position indicating element 416 and an axial position indicating element 426 that are coupled to the moving member 412 and which move relative to the frame (e.g., wherein the frame is included as part of the probe body, etc.) Various other components of the stylus position detection portion 411 may be fixed relative to the frame unless otherwise indicated. Various components of a similar stylus position detection portion are described in copending and commonly assigned U.S. patent application Ser. No. 14/973,431, entitled "Optical Configuration For Measurement Device", filed on Dec. 17, 2015, which is hereby incorporated herein by reference in its entirety.

The stylus position detection portion 411 includes a rotary position detection configuration 413 and an axial position detection configuration 425. As will be described in more detail below, the rotary position detection configuration 413 includes a rotary measurement spot generating configuration 450 and a rotary position sensitive detector 421. The axial position detection configuration 425 includes an axial measurement spot generating configuration 460 and an axial position sensitive detector 427. The rotary position sensitive detector 421 includes the rotary photodetector 422 and the axial position sensitive detector 427 includes the axial photodetector 428. Other configurations utilizing photodetectors are also described in a patent application entitled "Optical Configuration For Measurement Device Using Quadrant Photodetectors To Detect Measurement Spots From Emitter Material" (Attorney Docket No. 660051.494), which is filed concurrently herewith and is hereby incorporated herein by reference in its entirety.

The rotary measurement spot generating configuration 450 includes a light source that provides rotary source light along a rotary source light path 423, a beamsplitter 420, the rotary position indicating element 416, a rotary measurement spot path 423', a rotary lens 452, a rotary spatial filter 453 and a rotary source light filter 454. The axial measurement spot generating configuration 460 includes a light source that provides axial source light along an axial source light path 429, the beamsplitter 420, the axial position indicating element 426, an axial measurement spot path 429', an axial lens 462, an axial spatial filter 463 and an axial source light filter 464. In the example of FIG. 3, certain portions are common to both the rotary measurement spot generating configuration 450 and the axial measurement spot generating configuration 460 (e.g., the same light source is utilized in both configurations to provide the source light along the same source light paths 423 and 429 to the same beamsplitter 420). Alternatively, in other configurations separate components may be utilized for these portions of the configurations (e.g., as will be described in more detail below with respect to FIGS. 7 and 8).

In operation, source light (e.g., from the light source that is fixed relative to the frame) is provided along a source light path (i.e., corresponding to both the rotary source light path 423 and the axial source light path 429) as both rotary source light and axial source light to the beamsplitter 420. The beamsplitter 420 receives and splits the source light into the rotary source light which is directed toward the rotary position indicating element 416 and the axial source light which is directed toward the axial position indicating element 426. The rotary position indicating element 416 and the axial position indicating element 426 are attached to first and second surfaces of the beamsplitter 420. In an alternative implementation, multiple light sources may be utilized and for which a beamsplitter may not be required for splitting the source light into multiple paths, as will be described in more detail below with respect to FIGS. 7 and 8.

In various implementations, the rotary position indicating element 416 (i.e., which is fixed relative to the stylus coupling portion 442 and moves with the stylus coupling portion 442) includes a rotary position indicating emitter 451 including an emitter material (e.g., a phosphor filled resin, or the like that is fixed to a surface of the beamsplitter 420). In various implementations, the emitter material as generally described herein may comprise one or more conventional phosphor materials such as YAG-Ce+-based phosphors, or photoluminescent semiconductor nanoparticles or nanocrystals, or Q-particle phosphors (commonly called quantum dots or semiconductor quantum dots), or zinc oxide nanorods, or the like. The emitter material inputs the rotary source light (e.g., in a first wavelength range) from the rotary light source and responds by outputting excitation light generated within the emitter material (e.g., the generated excitation light comprising a second wavelength range not included in the first wavelength range). The rotary position indicating emitter 451 is configured to input the rotary source light along the rotary source light path 423 regardless of the position of the stylus coupling portion 442 within its motion range. The rotary position indicating emitter 451 is further configured to output the generated excitation light as rotary measurement light along the rotary measurement spot path 423' to form a rotary measurement spot 455 on the rotary position sensitive detector 421.

More specifically, the rotary measurement light is focused by the rotary lens 452 and passes through the rotary spatial filter 453 and the rotary source light filter 454 to form the measurement spot 455 on the rotary position sensitive detector 421. In various implementations, the rotary lens 452 and the rotary spatial filter 453 are positioned in a telecentric arrangement according to known principles, for imaging the generated excitation light from the rotary position indicating emitter 451 as the rotary measurement spot 455 on the rotary position sensitive detector 421. In various implementations, the rotary measurement spot 455 moves along the first and second sensing axis directions of the rotary position sensitive detector 421 corresponding to the rotary position of the stylus coupling portion 442 and the associated position of the rotary position indicating element 416 transverse to the axial direction (e.g., wherein the axial direction approximately corresponds to the Z axis direction). The rotary position sensitive detector 421 outputs at least first and second rotary signals in response to the position of the rotary measurement spot 455, and the at least first and second rotary signals are indicative of the rotary position of the stylus coupling portion 442.

In various implementations (e.g., due at least in part to the telecentric arrangement of the rotary lens 452 and the rotary spatial filter 453), a movement of the rotary position indicating emitter 451 may correspond to a specified amount of movement of the rotary measurement spot 455 on the rotary position sensitive detector 421. In one specific implementation, this may correspond to a 1:1 ratio, such that a movement of ΔY of the rotary position indicating emitter 451 may correspond to a same amount of movement ΔY of the rotary measurement spot 455 on the rotary position sensitive detector 421. In such an implementation, the movement or displacement $\Delta Y_{PSD}$ along the Y direction away from null (e.g., a reference or zero position, etc.) for the rotary measurement spot 455 on the rotary photodetector 422 of the rotary position sensitive detector 421 may be approximated as:

$$\Delta Y_{PSD} = H\theta_Y \qquad \text{(Eq. 1)}$$

where H is the distance from the rotation center RC to the rotary position indicating element 416, and $\theta_Y$ is the rotary motion tilt of the rotating member 436 in a plane parallel to the Y direction (i.e., that is, rotation about an axis parallel to the X axis at the rotation center RC). The Y direction movement or displacement $Y_{STYLUS}$ away from null (e.g., a reference or zero position, etc.) of the contact portion 448 of the stylus 406 in relation to the rotary motion tilt component $\theta_Y$ may be approximated as:

$$\Delta Y_{STYLUS} = \theta_Y *(h_S + l_S) \quad \text{(Eq. 2)}$$

where $h_S$ is the distance from the end of the stylus coupling portion 442 to the rotation center RC and $l_S$ is the length of the stylus 406. Combining Equations 1 and 2, the ratio of the Y direction spot displacement on the photodetector 422 in relation to the Y direction displacement at the contact portion 448 may be approximated as:

$$\Delta Y_{PSD}/\Delta Y_{STYLUS} = H/(h_S + l_S) \quad \text{(Eq. 3)}$$

It will be appreciated that the X coordinate motion components are analogous to the above expressions, and will not be explained in further detail herein. The stylus length $l_S$ for various styli may be utilized in the equations (e.g., with respect to the trigonometry of the system) for determining the X-Y position of the contact portion 448 based on the X-Y detected spot position.

In various implementations, the axial position indicating element 426 (i.e., which is fixed relative to the stylus coupling portion 442 and moves with the stylus coupling portion 442) includes an axial position indicating emitter 461 including an emitter material (e.g., phosphor, etc.) The emitter material inputs the axial source light (e.g., in a first wavelength range) from the axial light source and responds by outputting excitation light generated within the emitter material (e.g., the generated excitation light comprising a second wavelength range not included in the first wavelength range). The axial position indicating emitter 461 is configured to input the axial source light along the axial source light path 429 regardless of the position of the stylus coupling portion 442 within its motion range. The axial position indicating emitter 461 is further configured to output the generated excitation light as axial measurement light along the axial measurement spot path 429' to form an axial measurement spot 465 on the axial position sensitive detector 427.

More specifically, the axial measurement light is focused by the axial lens 462 and passes through the axial spatial filter 463 and the axial source light filter 464 to form the measurement spot 465 on the axial position sensitive detector 427. In various implementations, the axial lens 462 and the axial spatial filter 463 are positioned in a telecentric arrangement according to known principles, for imaging the generated excitation light from the axial position indicating emitter 461 as the axial measurement spot 465 on the axial position sensitive detector 427. In various implementations, the axial measurement 465 spot moves along a sensing axis direction of the axial position sensitive detector 427 corresponding to the position of the stylus coupling portion 442 along the axial direction (e.g., approximately corresponding to the Z-axis direction). The axial position sensitive detector 427 outputs at least one axial signal in response to the position of the axial measurement spot 465, and the at least one axial signal is indicative of the axial position of the stylus coupling portion 442.

In various implementations (e.g., due at least in part to the telecentric arrangement of the axial lens 462 and the axial spatial filter 463), a movement of the axial position indicating emitter 461 may correspond to a specified amount of movement of the axial measurement spot 465 on the axial position sensitive detector 427. In one specific implementation, this may correspond to a 1:1 ratio, such that a movement of $\Delta Z$ of the axial position indicating emitter 461 may correspond to a same amount of movement $\Delta Z$ of the axial measurement spot 465 on the axial position sensitive detector 427. In such an implementation, the movement or displacement $\Delta Z_{PSD}$ along the Z direction away from null (e.g., a reference or zero position, etc.) for the axial measurement spot 465 on the axial photodetector 428 of the axial position sensitive detector 427 in relation to the Z direction displacement $\Delta Z_{STYLUS}$ at a stylus contact portion (e.g., the contact portion 448) may be approximated as:

$$\Delta Z_{PSD}/\Delta Z_{STYLUS} \approx 1 \quad \text{(Eq. 4)}$$

In various implementations, mechanical complexity is avoided if the axial position indicating element 426 moves in at least one direction that is transverse to the axial direction, for example as illustrated in FIG. 3, both the axial position indicating element 426 and the rotary position indicating element 416 Move in 3 directions. However, according to the principles disclosed herein, motion of the axial position indicating element 426 approximately transverse to the axial direction (i.e., approximately along the Y axis) does not substantially alter the signal corresponding to the effective position of that spot or line on the axial photodetector 428. The resulting Z position signal is substantially insensitive to such Y axis motion. In addition, an expected range of motion of the axial position indicating element 426 approximately along the X axis direction as produced by small $\theta_X$ rotations of the stylus may alter the effective position of a spot (not a line) on the axial photodetector 428 along the "unsensed" X axis direction without substantially altering its Z position, making the Z position signal substantially insensitive to such X axis motion. However, it is worth noting that the motion arc of the axial position indicating element 426 produced by a large $\theta_X$ rotation of the stylus may produce an arc motion of the axial measurement spot 465 on the axial photodetector 428 that includes a small Z position change component, in addition to an undesirable and/or unsensed X axis position change component of the axial measurement spot 465. Calibration or compensation may be used to reduce or eliminate related residual Z error effects in signal processing. In general, known types of calibration to reduce any cross coupling errors and/or iterative/interdependent position coordinate determination methods may be used to further improve the accuracy of measured X, Y and Z position or displacement values, if desired.

In various implementations, the spatial filters 453 and 463 (e.g., including respective central apertures) allow the corresponding telecentric imaging configurations to image the corresponding measurement spots 455 and 465 onto the respective photodetectors 422 and 428 with better accuracy and less sensitivity to focus. The lower sensitivity to focus may be desirable in certain configurations because the moving member 412 moves the position indicating emitters 451 and 461 to different focal distances, wherein it may be preferable for the measurement spots 455 and 465 to not be significantly affected by the different focal distances. More specifically, the primary position determining techniques may relate to the lateral movements of the measurement spots 455 and 465 on the respective photodetectors 422 and 428, for which it may be undesirable for the measurement spots 455 and 465 to change significantly due to focus changes. In this regard, it will be appreciated that the respective apertures of the spatial filters 453 and 463 effectively "select" the approximately collimated rays which correspond to the physical location and extent of the position indicating emitters 451 and 461, which is what the system is designed to detect.

In various implementations, the source light filters 454 and 464 are configured to prevent stray source light (i.e., which in various implementations may be a relatively strong light) from reaching the photodetectors 422 and 428. The source light filters 454 and 464 are also configured to allow the emitted light from the position indicating emitters 451 and 461 (i.e., which in various implementations may be a relatively weak light) to reach the respective photodetectors 422 and 428. In various implementations, the source light filters 454 and 464 may be configured as high pass filters, band pass filters, or any other type of filtering profile that passes the desired emitted wavelength and blocks other wavelengths. In various implementations, the selection of the type of filter to utilize may depend on the relationship between the source light spectrum (e.g., comprising a first wavelength range) and the emitted spectrum (e.g., comprising a second wavelength range). In various implementations, the emitter material of the position indicating emitters 451 and 461 may be selected to have a relatively limited emitted spectrum (e.g., to allow for more effective filtering), and may further be selected to have an emitted spectrum that matches a sensitivity spectrum of the photodetectors 422 and 428.

FIG. 4 is a partially schematic diagram showing one implementation of a cross section of the stylus suspension portion 407' usable as the stylus suspension portion 407 represented in FIG. 3, as included within a main body frame 408 of a probe main body 402 of a scanning probe 400. As shown in FIG. 4, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body frame 408 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The scanning probe 400 includes a stylus position detection portion 511 having components and operation described in greater detail below with reference to FIG. 5, for determining the position and/or motion of the stylus motion mechanism 409 and/or the contact portion 448 of the stylus 406.

The flexure element 440 (i.e., referenced as a second flexure element) may be disposed between the respective planes of a pair of flexure elements 414 and 415 (i.e., referenced as first flexure elements) in the axial direction O. Examples of flexure elements 414, 415 and 440 will be described in more detail below with respect to FIGS. 11A and 11B. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the contact portion 448 to move in the axial direction O. A rotary motion mechanism 434 including the rotating member 436 allows the contact portion 448 of the stylus 406 to move transverse (e.g., approximately perpendicular) to the axial direction O by means of rotary motion about the rotation center RC.

The moving member 412 integrally includes: a lower portion 412A; a rod portion 412B; and an upper portion 412C. As described in more detail below with respect to the stylus position detection portion 511 shown in FIG. 5, a single position indicating element functions both as a rotary position indicating element 516 that is included as part of a rotary position detection configuration, and as an axial position indicating element 526 that is included as part of an axial position detection configuration. The position indicating element that functions as both the rotary position indicating element 516 and the axial position indicating element 526 is attached to the upper portion 412C. The rod portion 412B is disposed between the pair of first flexure elements 414 and 415. The rod portion 412B is housed in the rotating member 436.

The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli).

FIG. 5 is a diagram showing a second exemplary implementation of a stylus position detection portion 511 as included in the scanning probe 400 of FIG. 4. The stylus position detection portion 511 of FIG. 5 is coupled to the main body frame 408 of the scanning probe 400 of FIG. 4. As will be described in more detail below, a position indicating element that functions as both the axial position indicating element 526 and the rotary position indicating element 516 is attached to the moving member 412 and its attached stylus coupling portion 442. Otherwise, various illustrated elements may be fixed directly or indirectly relative to the main body frame 408. In various implementations, the X and Y position signals from the rotary photodetector 522 in combination with the Z position signal from the axial photodetector 528 enable determination of the position of the position indicating element that functions as both the rotary position indicating element 516 and the axial position indicating element 526, which correspondingly indicates an absolute 3D position of the stylus coupling portion 442 (and attached stylus 406 and contact portion 448) relative to the main body frame 408. Alignment of the light source 518 may affect the overall performance of the system. In order to allow a proper alignment of the light source 518 and/or collimation lens 518', an alignment assembly such as assembly 541 comprising a Z position tube 542, an X-Y tube 543, and holder/baffle 544, may be used in some implementations.

In general, the stylus position detection portion 511 includes certain components that are similar to those of the stylus position detection portion 411 of FIG. 3, and will be understood to operate similarly except as otherwise described below. As will be described in more detail below, certain differences from the implementation of FIG. 3 include that a single position indicating element functions as both the axial position indicating element 526 and the rotary position indicating element 516, and includes a single position indicating emitter that functions as both a rotary position indicating emitter 551 and an axial position indicating emitter 561. As illustrated in FIG. 5, the stylus position detection portion 511 includes a rotary position detection configuration 513 and an axial position detection configuration 525. The rotary position detection configuration 513 includes a rotary measurement spot generating configuration 550 and a rotary position sensitive detector 521. The axial position detection configuration 525 includes an axial measurement spot generating configuration 560 and an axial position sensitive detector 527. As illustrated, the axial position sensitive detector 527 includes an axial photodetector 528 having a surface plane which may be approximately parallel to the surface plane of a rotary photodetector 522 of the rotary position sensitive detector 521, which is another difference from the configuration of FIG. 3 and which in certain implementations may provide certain advantages with respect to the location and organization of the electronic components in the scanning probe 400.

The rotary measurement spot generating configuration 550 includes a light source 518 with a collimating lens 518' that provides rotary source light along a rotary source light path 523, a beamsplitter 520, the position indicating element that functions as the rotary position indicating element 516, a rotary measurement spot path 523', a rotary lens 552, a rotary spatial filter 553 and a rotary source light filter 554. The axial measurement spot generating configuration 560 also includes the light source 518 with the collimating lens 518' that provides axial source light along an axial source light path 529, the beamsplitter 520, the position indicating element that also functions as the axial position indicating element 526, an axial measurement spot path 529', an axial lens 562, an axial spatial filter 563 and an axial source light filter 564.

In operation, source light (e.g., comprising a first wavelength range) from the light source 518 is provided along a source light path (i.e., corresponding to both the rotary source light path 523 and the axial source light path 529) as both rotary source light and axial source light which passes through the beamsplitter 520. The source light reaches the position indicating emitter that functions as both a rotary position indicating emitter 551 and an axial position indicating emitter 561, for which the emitter material inputs the source light and responds by outputting excitation light generated within the emitter material (e.g., the generated excitation light comprising a second wavelength range not included in the first wavelength range). A portion of the generated excitation light travels as rotary measurement light along the rotary measurement spot path 523' to form a rotary measurement spot 555 on the rotary position sensitive detector 521, and another portion of the generated excitation light travels as axial measurement light along the axial measurement spot path 529' to form an axial measurement spot 565 on the axial position sensitive detector 527.

More specifically, the rotary measurement light is focused by the rotary lens 552 and is directed by the beamsplitter 520 to pass through the rotary spatial filter 553 and the rotary source light filter 554 to form the rotary measurement spot 555 on the rotary position sensitive detector 521. The rotary position sensitive detector 521 outputs at least first and second rotary signals in response to the position of the rotary measurement spot 555, and the at least first and second rotary signals are indicative of the rotary position of the stylus coupling portion 442. The axial measurement light is focused by the axial lens 562 and passes through the axial spatial filter 563 and the axial source light filter 564 to form the axial measurement spot 565 on the axial position sensitive detector 527. The axial position sensitive detector 527 outputs at least one axial signal in response to the position of the axial measurement spot 565, and the at least one axial signal is indicative of the axial position of the stylus coupling portion 442.

In various implementations, the position indicating emitter 551/561 may be of a particular shape and/or size. For example, in one specific implementation, the position indicating emitter may be configured as a phosphor bead of a particular size (e.g., 200 um to 400 um in diameter). The light source 518 for illuminating the position indicating emitter may also be specified as a particular type, such as a pump laser. In such a configuration, in various implementations the pump laser may be operated in a continuous wave mode if light levels are low enough, or may be operated in a pulsed mode at higher intensity to avoid quenching the phosphor, etc.

Figure 6:
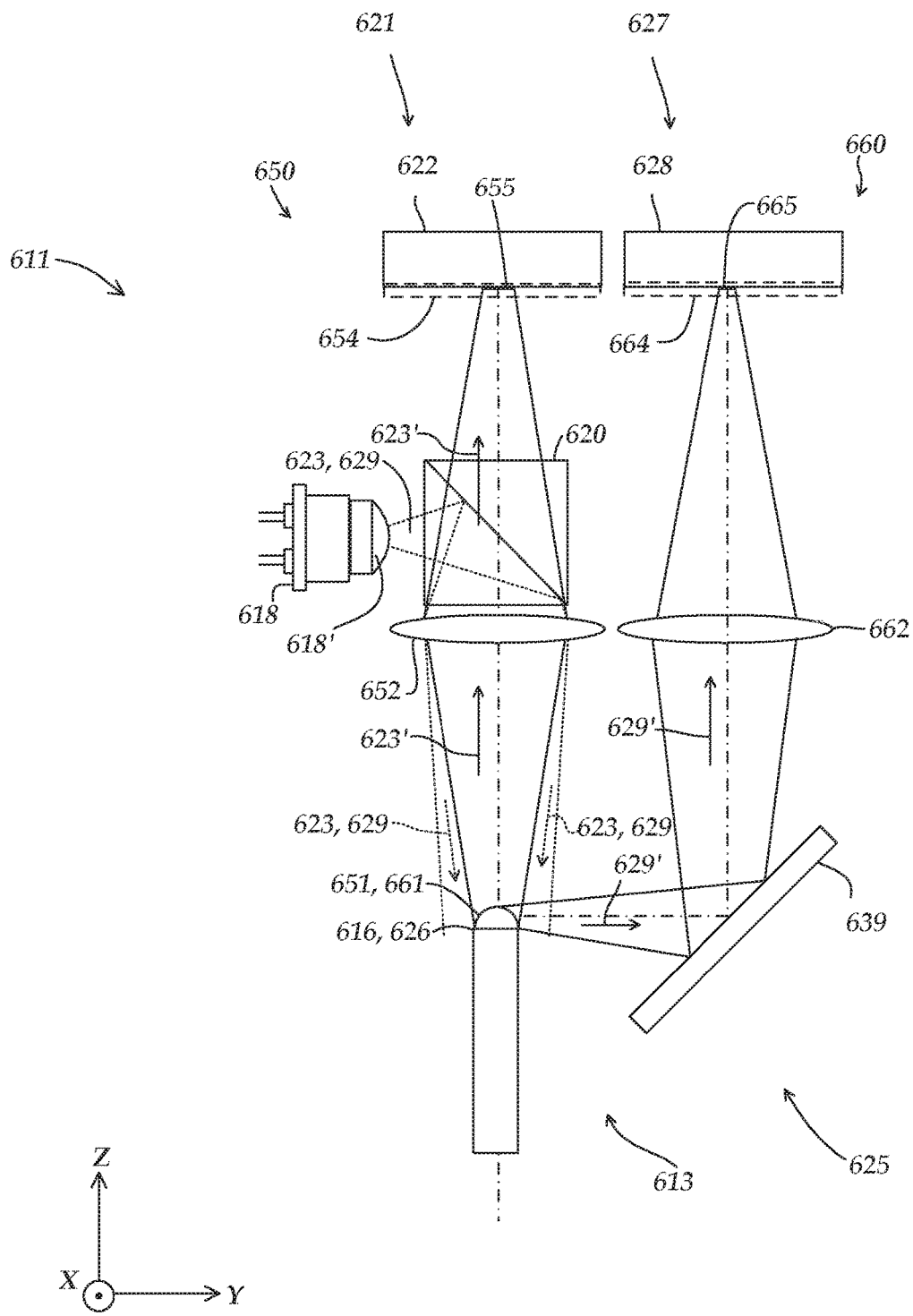
FIG. 6 is a partially schematic diagram showing a third exemplary implementation of a stylus position detection portion.

FIG. 6 is a diagram showing a third exemplary implementation of a stylus position detection portion 611. Certain components of the stylus position detection portion 611 are similar to those of the stylus position detection portion 511 of FIG. 5, and will be understood to operate similarly except as otherwise described below. Certain differences from the implementation of FIG. 5 include that the orientations of a light source 618, a rotary position sensitive detector 621 and an axial position sensitive detector 627 have been rotated 90 degrees counterclockwise relative to a position indicating element. As illustrated in FIG. 6, the stylus position detection portion 611 includes a rotary position detection configuration 613 and an axial position detection configuration 625. The rotary position detection configuration 613 includes a rotary measurement spot generating configuration 650 and a rotary position sensitive detector 621. The axial position detection configuration 625 includes an axial measurement spot generating configuration 660 and an axial position sensitive detector 627. As illustrated, the axial position sensitive detector 627 includes an axial photodetector 628 having a surface plane which may be approximately parallel to the surface plane of a rotary photodetector 622 of the rotary position sensitive detector 621.

The rotary measurement spot generating configuration 650 includes a light source 618 with a collimating lens 618' that provides rotary source light along a rotary source light path 623, a beamsplitter 620, a position indicating element that functions as a rotary position indicating element 616, a rotary measurement spot path 623', a rotary lens 652, a rotary spatial filter 653 and a rotary source light filter 654. The axial measurement spot generating configuration 660 also includes the light source 618 with the collimating lens 618' that provides axial source light along an axial source light path 629, the beamsplitter 620, the position indicating element that also functions as an axial position indicating element 626, an axial measurement spot path 629', a reflecting element 639 (e.g., a mirror), an axial lens 662, an axial spatial filter 663 and an axial source light filter 664.

In operation, source light (e.g., comprising a first wavelength range) from the light source 618 is provided along a source light path (i.e., corresponding to both the rotary source light path 623 and the axial source light path 629) as both rotary source light and axial source light which is reflected by the beamsplitter 620 toward the position indicating element that includes the position indicating emitter that functions as both a rotary position indicating emitter 651 and an axial position indicating emitter 661. The emitter material inputs the source light and responds by outputting excitation light generated within the emitter material (e.g., the generated excitation light comprising a second wavelength range not included in the first wavelength range). A portion of the generated excitation light travels as rotary measurement light along the rotary measurement spot path 623' to form a rotary measurement spot 655 on the rotary position sensitive detector 621, and another portion of the generated excitation light travels as axial measurement light along the axial measurement spot path 629' to form an axial measurement spot 665 on the axial position sensitive detector 627.

In various implementations, the beamsplitter 620 is configured to reflect only the first wavelength range (i.e., of the source light). In this regard, in certain implementations the reflective surface of the beamsplitter 620 may function as a narrowband reflective filter, wherein the source light is also narrowband which is provided in the first wavelength range which functions to excite the position indicating emitter that functions as both the rotary position indicating emitter 651 and the axial position indicating emitter 661. The beamsplitter is configured to not significantly reflect the second wavelength range of the position indicating emitter, wherein the second wavelength range is strongly sensed in the detector sensing spectrum of the rotary position sensitive detector 621 and the axial position sensitive detector 627.

The collimating lens 618' lens on the light source 618 works in combination with the imaging lens 652 that receives the source light, to concentrate the source light near the position indicating emitter 651/661, but with a broad enough beam to allow the position indicating emitter to remain in the source light as the position indicating emitter moves (i.e., as attached to the moving member 412). The imaging lenses 652 and 662 are also configured to image the position indicating emitter 651/661 onto the photodetectors 622 and 628, respectively. In the example implementation of FIG. 6, the axial measurement spot path 629' (e.g., including the mirror 639) may be longer than the rotary measurement spot path 623'. In general, the axial lens 662 is configured and located to fulfill the function of imaging the position indicating emitter onto the axial photodetector 628, and the rotary lens 652 is configured and located to fulfill the function of imaging the position indicating emitter onto the rotary photodetector 622. In the example implementation of FIG. 6, the lenses 652 and 662 are coplanar, and the photodetectors 622 and 628 are coplanar, which may provide various advantages. It will be appreciated that in various implementations, different configurations and locations of components may be implemented for various reasons (e.g., practical spacing, economic considerations, etc.)

Figure 7:
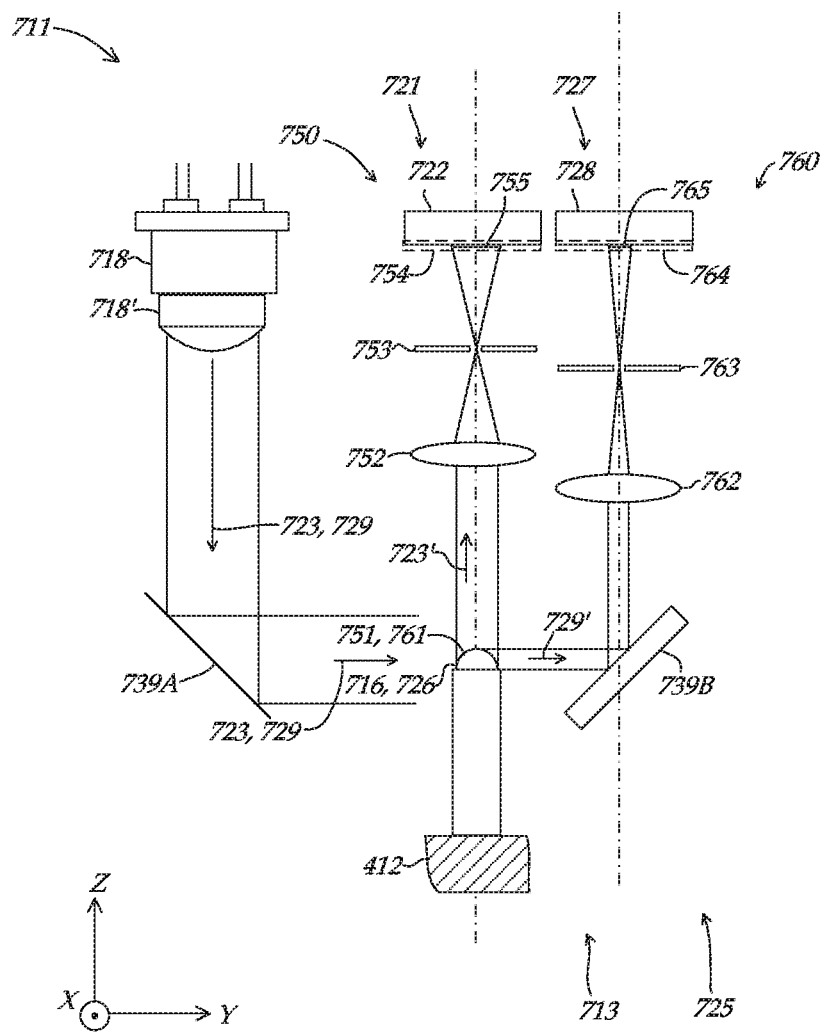
FIG. 7 is a partially schematic diagram showing a fourth exemplary implementation of a stylus position detection portion.

FIG. 7 is a diagram showing a fourth exemplary implementation of a stylus position detection portion 711. Certain components of the stylus position detection portion 711 are similar to those of the stylus position detection portion 511 of FIG. 5, and will be understood to operate similarly except as otherwise described below. Certain differences from the implementation of FIG. 5 include that a rotary position sensitive detector 721 and an axial position sensitive detector 727 have been rotated 90 degrees counterclockwise relative to a position indicating element so as to be coplanar with a light source 718 (e.g., as may be advantageous for certain electronic configurations, etc.) As illustrated in FIG. 7, the stylus position detection portion 711 includes a rotary position detection configuration 713 and an axial position detection configuration 725. The rotary position detection configuration 713 includes a rotary measurement spot generating configuration 750 and a rotary position sensitive detector 721. The axial position detection configuration 725 includes an axial measurement spot generating configuration 760 and an axial position sensitive detector 727. As illustrated, the axial position sensitive detector 727 includes an axial photodetector 728 having a surface plane which may be approximately parallel to the surface plane of a rotary photodetector 722 of the rotary position sensitive detector 721.

The rotary measurement spot generating configuration 750 includes a light source 718 with a collimating lens 718' that provides rotary source light along a rotary source light path 723, a reflecting element 739A (e.g., a mirror), a position indicating element that functions as a rotary position indicating element 716, a rotary measurement spot path 723', a rotary lens 752, a rotary spatial filter 753 (e.g., a spatially filtering lens) and a rotary source light filter 754. The axial measurement spot generating configuration 760 also includes the light source 718 with the collimating lens 718' that provides axial source light along an axial source light path 729, the reflecting element 739A, the position indicating element that also functions as an axial position indicating element 726, an axial measurement spot path 729', a reflecting element 739B (e.g., a mirror), an axial lens 762, an axial spatial filter 763 (e.g., a spatially filtering lens) and an axial source light filter 764.

In operation, source light (e.g., comprising a first wavelength range) from the light source 718 is provided along a source light path (i.e., corresponding to both the rotary source light path 723 and the axial source light path 729) as both rotary source light and axial source light which is reflected by the reflecting element 739A toward the position indicating element that includes the position indicating emitter that functions as both a rotary position indicating emitter 751 and an axial position indicating emitter 761. In various implementations, the light source 718 with the collimating lens 718' provides the source light in the form of a collimated light beam that is broad enough to allow the position indicating emitter 751/761 to remain in the source light over the movement range of the position indicating emitter. The emitter material inputs the source light and responds by outputting excitation light generated within the emitter material (e.g., the generated excitation light comprising a second wavelength range not included in the first wavelength range). A portion of the generated excitation light travels as rotary measurement light along the rotary measurement spot path 723' to form a rotary measurement spot 755 on the rotary position sensitive detector 721, and a portion of the generated excitation light travels as axial measurement light along the axial measurement spot path 729' to form an axial measurement spot 765 on the axial position sensitive detector 727.

In various implementations, the imaging lenses 752 and 762 are configured to image the position indicating emitter 751/761 onto the photodetectors 722 and 728, respectively. In the example implementation of FIG. 7, the axial measurement spot path 729' (e.g., including the mirror 739B) may be longer than the rotary measurement spot path 723'. In general, the axial lens 762 is configured and located to fulfill the function of imaging the position indicating emitter onto the axial photodetector 728, and the rotary lens 752 is configured and located to fulfill the function of imaging the position indicating emitter onto the rotary photodetector 722. In one implementation in which telecentric arrangements are utilized, the rotary lens 752 and the axial lens 762 are located according to the principle that an object may be at 2f (i.e., at 2x the focus distance) from the lens, and will be imaged in focus 2f behind the lens. The apertures (e.g., the spatially filtering lenses 753 and 763) at 1f allow only collimated input rays through to create the images of the position indicating emitter on the respective photodetectors 722 and 728. In accordance with this configuration, in one implementation the focal length of the axial lens 762 may be longer than the focal length of the rotary lens 752. It will be appreciated that in various implementations, different configurations and locations of components may be implemented for various reasons (e.g., practical spacing, economic considerations, etc.)

It will be appreciated that in various implementations telecentric arrangements may result in a more constant measurement spot sizes on the photodetectors 722 and 728 as the position indicating emitter 751/761 moves to different distances along the focus axis (i.e., wherein the collimated rays still define the emitter edges). In various implementations, for such movements the emitter edges may get "fuzzier" or otherwise blurrier, but the nominal spot size may not significantly change. Such configurations may thus reduce cross-coupling effects, which may otherwise influence the measurement spot sizes on the "cross-coupled" photodetectors (e.g., as axial motion changes the "focusing distance" of the rotary channel). Such movements would alter the measurement spot sizes more significantly in a non-telecentric arrangement (e.g., as illustrated in FIG. 6). In various implementations, such issues (e.g., varying spot sizes) may be addressed with calibration, although in certain implementations it may be desirable to configure the optical components to reduce such issues.

Figure 8:
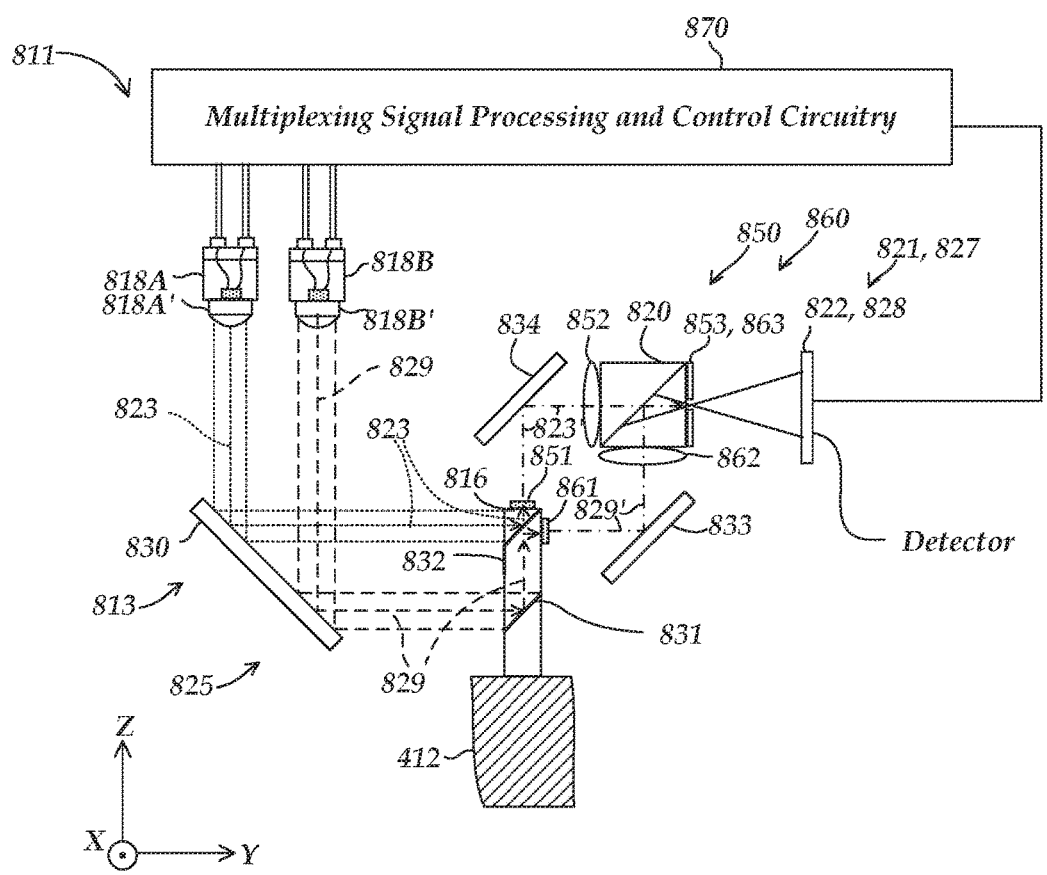
FIG. 8 is a partially schematic diagram showing a fifth exemplary implementation of a stylus position detection portion.

FIG. 8 is a diagram showing a fifth exemplary implementation of a stylus position detection portion 811. Certain components of the stylus position detection portion 811 are similar to those of the stylus position detection portion 411 of FIG. 3, and will be understood to operate similarly except as otherwise described below. Certain differences from the implementation of FIG. 3 include that multiplexing signal processing and control circuitry 870 is provided which controls a rotary light source 818A and an axial light source 8186, and which demultiplexes signals from a position sensitive detector. As illustrated in FIG. 8, the stylus position detection portion 811 includes a rotary position detection configuration 813 and an axial position detection configuration 825. The rotary position detection configuration 813 includes a rotary measurement spot generating configuration 850 and a position sensitive detector that functions as a rotary position sensitive detector 821. The axial position detection configuration 825 includes an axial measurement spot generating configuration 860 and the position sensitive detector that also functions as an axial position sensitive detector 827. As illustrated, the position sensitive detector 821/827 includes a photodetector that functions both as a rotary photodetector 822 and an axial photodetector 828.

The rotary measurement spot generating configuration 850 includes a light source 818A with a collimating lens 818A' that provides rotary source light along a rotary source light path 823, a reflecting element 830, a reflecting element 832, a rotary position indicating element 816, a reflecting element 834, a rotary measurement spot path 823', a rotary lens 852, a beamsplitter 820 and a spatial filter that functions as a rotary spatial filter 853. The axial measurement spot generating configuration 860 includes an axial light source 818B with a collimating lens 818B' that provides axial source light along an axial source light path 829, the reflecting element 830, a reflecting element 831, a reflecting element 832, an axial position indicating element 826, an axial measurement spot path 829', a reflecting element 833, an axial lens 862, the beamsplitter 820, and the spatial filter that also functions as an axial spatial filter 863.

In operation, rotary source light (e.g., comprising a first wavelength range) from the rotary light source 818A is provided along the rotary source light path 823 and is reflected by the reflecting elements 830 and 832 to be directed toward a rotary position indicating emitter 851 of the rotary position indicating element 816. The emitter material inputs the source light and responds by outputting excitation light generated within the emitter material (e.g., the generated excitation light comprising a second wavelength range not included in the first wavelength range). The generated excitation light travels as rotary measurement light along the rotary measurement spot path 823' to form a rotary measurement spot 855 on the position sensitive detector that functions as the rotary position sensitive detector 821. Axial source light (e.g., comprising a first wavelength range) from the light source 818B is provided along the axial source light path 829 and is reflected by the reflecting elements 830, 831 and 832 to travel toward an axial position indicating emitter 861 of the axial position indicating element 826. The emitter material inputs the source light and responds by outputting excitation light (e.g., the generated excitation light comprising a second wavelength range not included in the first wavelength range). The generated excitation light travels as axial measurement light along the axial measurement spot path 829' to form an axial measurement spot 865 on the position sensitive detector that also functions as the rotary position sensitive detector 827.

The multiplexing signal processing and control circuitry 870 receives the multiplexed X, Y and Z position signals from the position sensitive detector that functions as the rotary position sensitive detector 821 and the axial position sensitive detector 827. The multiplexing signal processing and control circuitry 870 then performs demultiplexing operations to separate the X and Y position signals (i.e., received from the rotary photodetector 822) from the Z position signal (i.e., received from the axial photodetector 828). Operations of such multiplexing signal processing and control circuitry are described in more detail in copending and commonly assigned U.S. patent application Ser. No. 14/973,376, entitled "Measurement Device With Multiplexed Position Signals", filed on Dec. 17, 2015, which is hereby incorporated herein by reference in its entirety.

In various implementations, the reflecting elements 831, 832, 833 and 834 are 100% reflecting mirrors. For at least the reflecting element 832, both sides may be 100% reflective. In various implementations, the reflecting elements 831 and 832 may comprise mirrored prism surfaces (e.g., on a transparent glass block assembly), or they may be individual mirrors assembled on a frame for which the optical path may be directed through air. In various implementations, the reflecting elements 831 and 832 and the position indicating emitters 851 and 861 are coupled to the moving member 412, while the remaining elements of the stylus position detection portion 811 are coupled to the frame.

In various implementations, the beamsplitter 820 may comprise a 50% reflecting mirror. Alternatively, the emitter material may comprise narrow band phosphors or may produce different wavelength outputs, and the beamsplitter 820 may comprise a dichroic filter/reflector that transmits all of the rotary emitter wavelength range (i.e., as received from the reflecting element 834) and reflects all of the axial emitter wavelength range (i.e., as received from the reflecting element 833). In various implementations, the position sensitive detector 821/827 is a 2D detector. In various implementations, the light sources 818A and 818B are alternately activated as controlled by the multiplexing signal processing and control circuitry 870. In various alternative implementations, the light sources 818A and 818B may be continuously modulated and the position sensitive detector 821/827 may be continuously demodulated at the same time, but at respective frequencies so that the detector signals can be separated by filtering/demodulating circuits in the multiplexing signal processing and control circuitry 870.

Figure 9:
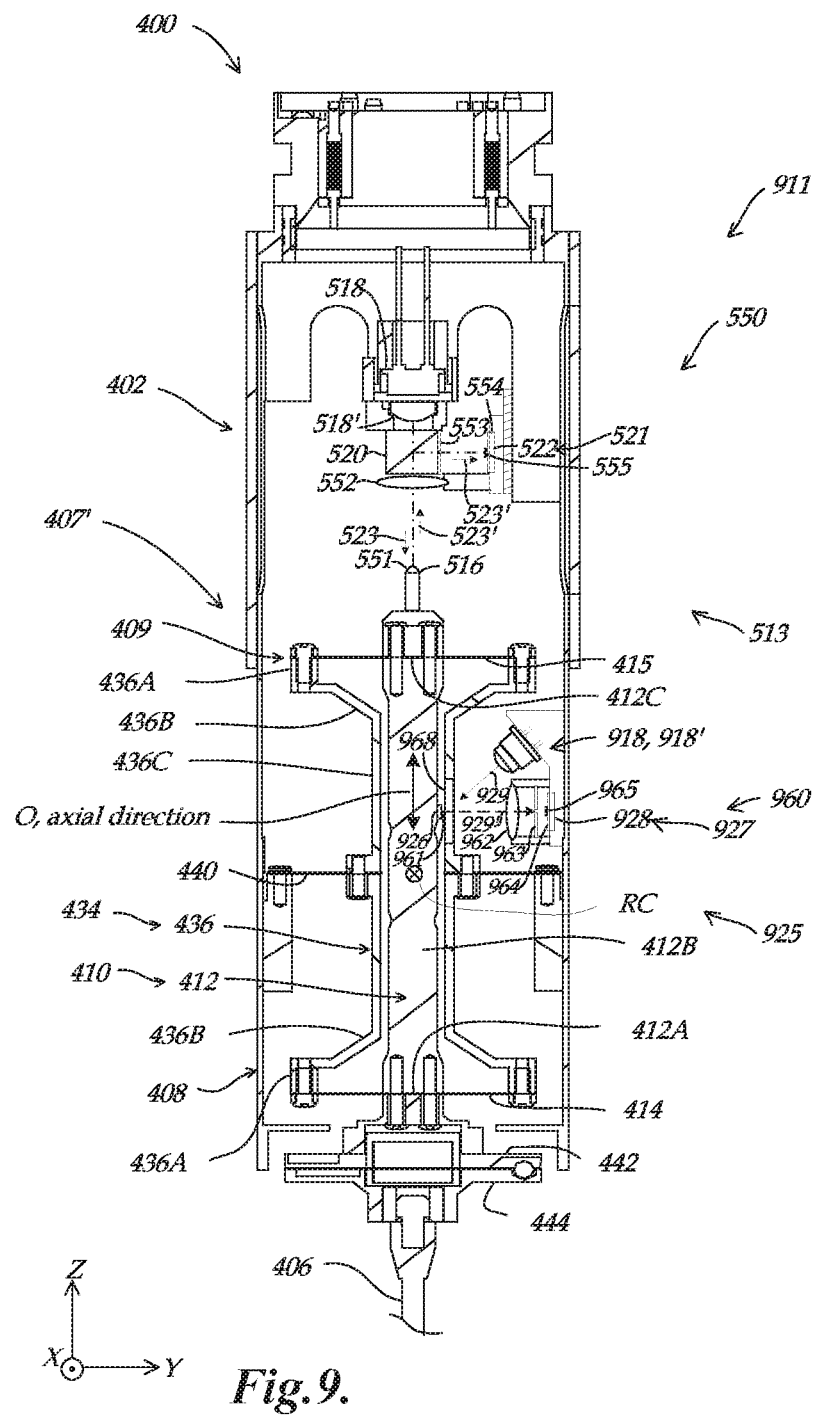
FIG. 9 is a diagram showing a sixth exemplary implementation of a stylus position detection portion as included in a scanning probe similar to that shown in FIG. 4.

FIG. 9 is a diagram showing a sixth exemplary implementation of a stylus position detection portion 911 as included in the scanning probe of FIG. 4. Certain components of the stylus position detection portion 911 are similar to those of the stylus position detection portion 511 of FIG. 5, and will be understood to operate similarly except as otherwise described below. Certain differences from the implementation of FIG. 5 include that a separate axial position detection configuration 925 is provided that is spatially separated from the rotary position detection configuration.

As illustrated in FIG. 9, the stylus position detection portion 911 includes the rotary position detection configuration 513 and the axial position detection configuration 925. The rotary position detection configuration 513 is described in more detail above with respect to FIG. 5. The axial position detection configuration 925 includes an axial measurement spot generating configuration 960 and an axial position sensitive detector 927. As illustrated, the axial position sensitive detector 927 includes an axial photodetector 928. The axial measurement spot generating configuration 960 includes a light source 918 with a collimating lens 918' that provides axial source light along an axial source light path 929, a window element 968, an axial position indicating element 926, an axial measurement spot path 929', an axial lens 962, an axial spatial filter 963 and an axial source light filter 964.

In operation, source light (e.g., comprising a first wavelength range) from the light source 918 is provided along the axial source light path 929 as axial source light that travel through the window element 968 to an axial position indicating emitter 961 of the axial position indicating element 926. The emitter material inputs the source light and responds by outputting excitation light generated within the emitter material (e.g., the generated excitation light comprising a second wavelength range not included in the first wavelength range). The generated excitation light travels as axial measurement light along the axial measurement spot path 929' to form an axial measurement spot 965 on the axial position sensitive detector 927.

In various implementations, the axial position indicating emitter 961 is coupled to the rod portion 412B of the moving member 412 and is visible through the window element 968 which provides a window through the cylindrical portion 436C of the rotating member 436. It will be appreciated that the location of the axial position indicating emitter 961 near the rotation center RC may result is less cross-coupling issues (e.g., with correspondingly fewer cross-coupling errors) with respect to the rotary motion of the moving member 412. It will be appreciated that in alternative implementations, other configurations and/or locations for the source light paths, position indicating emitters and position sensitive detectors may be utilized, in particular with regard to the advantageous ability for the position indicating emitters to be located on existing/native components of a moving assembly such as that of the stylus suspension portion 407.

In various implementations, an axial light source 418 and the axial position sensitive detector 927 may be connected to the electronics by various means (e.g., flex print connector or the like). In various implementations, each of the light sources 418 and 918 may provide respective source light in the form of a light beam that is broad enough to allow the respective position indicating emitters 551 and 961 to remain in the source light over the respective movement ranges of the position indicating emitters 551 and 961.

Figure 10:
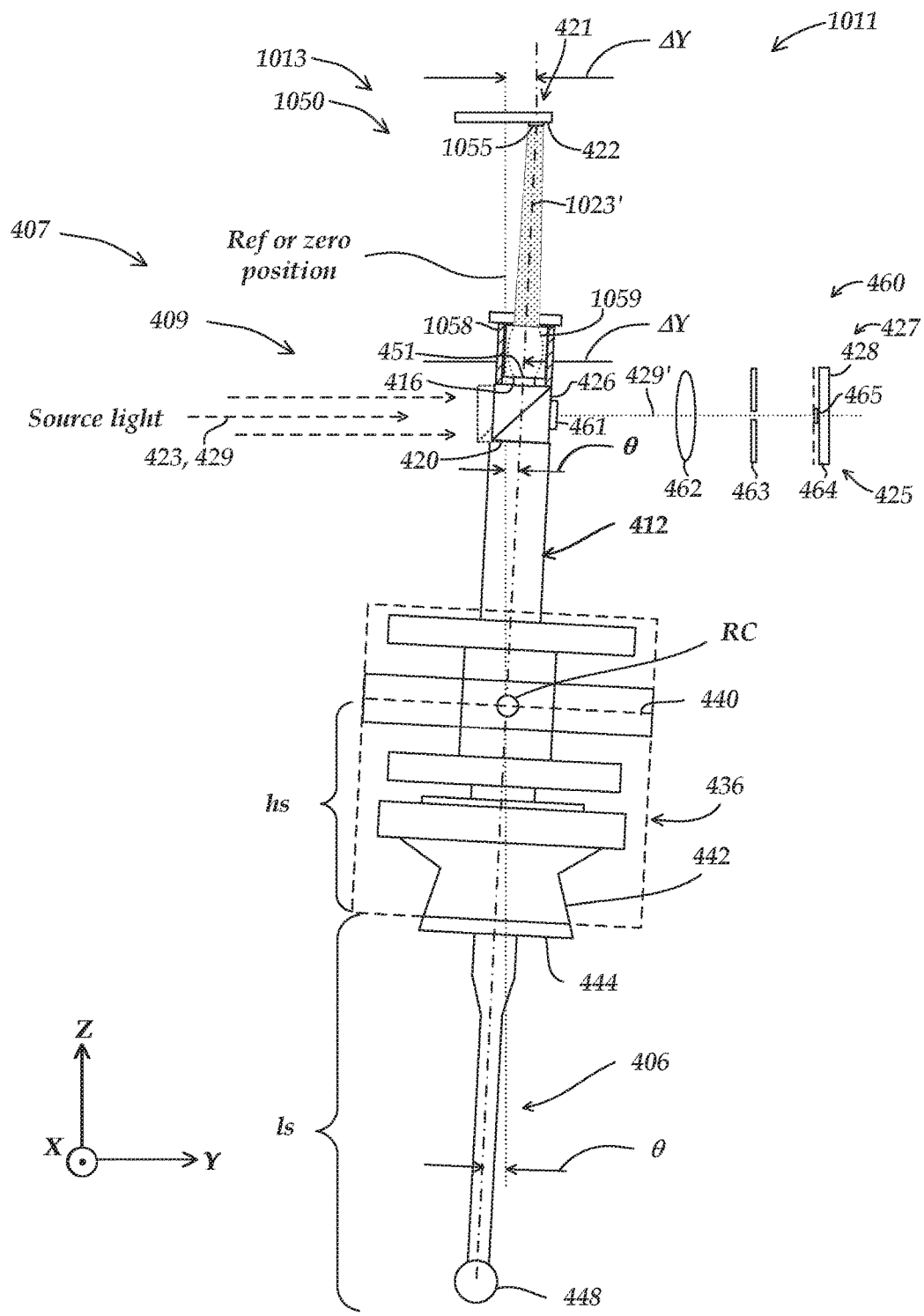
FIG. 10 is a partially schematic diagram showing a seventh exemplary implementation of a stylus position detection portion as used in combination with the stylus suspension portion of FIG. 3.

FIG. 10 is a diagram showing a showing a seventh exemplary implementation of a stylus position detection portion 1011 as used in combination with the stylus suspension portion of FIG. 3. Certain components of the stylus position detection portion 1011 are similar to those of the stylus position detection portion 411 of FIG. 3, and will be understood to operate similarly except as otherwise described below. Certain differences from the implementation of FIG. 3 include that a rotary position detection configuration 1013 has been modified to include a gradient index lens 1059.

As illustrated in FIG. 10, the stylus position detection portion 1011 includes the rotary position detection configuration 1013 and the axial position detection configuration 425. The axial position detection configuration 425 is described in more detail above with respect to FIG. 3. The rotary position detection configuration 1013 is similar to the rotary position detection configuration 413 of FIG. 3, except as modified to include the gradient index lens 1059. More specifically, the gradient index lens 1059 is located inside a sleeve assembly 1058 with an aperture at the top of the gradient index lens 1059. The rotary position indicating emitter 451 is located at the bottom of the gradient index lens 1059, and the sleeve assembly 1058 is located on top of the beamsplitter 420 such that the rotary position indicating emitter 451 is illuminated by the source light from the beamsplitter 420, similar to the configuration of FIG. 3. As described above, in the implementation of FIG. 3, the rotary position indicating emitter 451 is imaged by the rotary lens 452 onto the rotary position sensitive detector 421, and therefore has a ΔY moment arm that ends at the position indicating emitter 451. In contrast, in the implementation of FIG. 10, the gradient index lens 1059 focuses the emitted light and projects it along a rotary measurement spot path 1023', such that the moment arm for a rotary measurement spot 1055 extends to the rotary position sensitive detector 421.

It will be appreciated that the variations shown in FIGS. 3-10 are indicative of the possibility of further rearranging and/or adjusting various optical elements and related optical paths while retaining many or all of the advantages outlined in association with the principles disclosed herein. For example, in various implementations, a position indicating emitter with the emitter material (e.g., phosphor) may be implemented as part of a miniature assembly that produces a less diffuse/more concentrated beam, such as described in U.S. Patent Publication Nos. 2013/0222772 and 2017/0017091, each of which is hereby incorporated herein by reference in its entirety. In general, it will be understood that the various implementations disclosed herein are intended to be exemplary only and not limiting.

In various implementations, the configurations illustrated in FIGS. 3-10 may provide various advantages. For example, the emitter material (e.g., phosphor) utilized in the position indicating emitters may be a passive element such that environmental position drift may be reduced (e.g., as compared to other potential light sources such as an LED point source which may experience turn on drift, etc.) In configurations where most or all of the collection optics are fixed (e.g., attached to the frame), any cross coupling that might otherwise occur due to moving optics (e.g., wherein purely rotary movement such as in θY may be undesirably detected as axial movement according to movement of the axial measurement spot on the axial position sensitive detector or vice versa) may be reduced or eliminated.

Figures 11A, 11B:
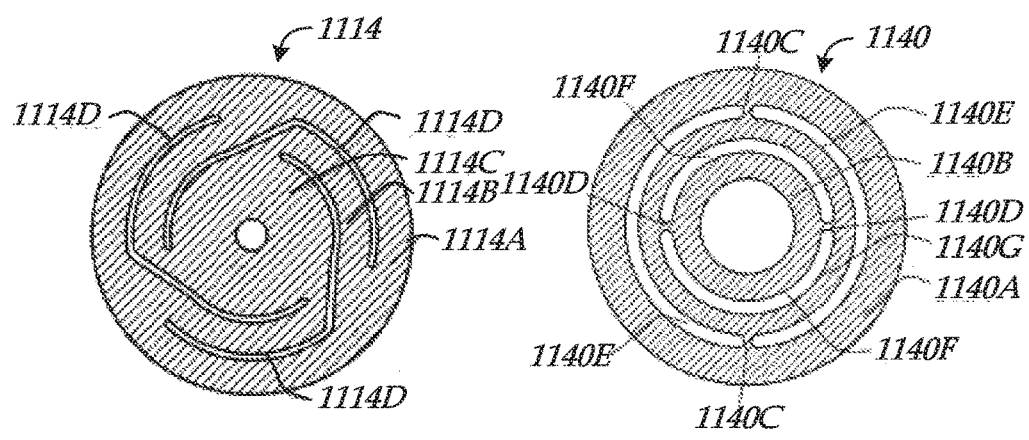
FIGS. 11A and 11B are diagrams showing implementations of flexure elements such as may be utilized in a stylus suspension portion for enabling axial and rotary motion.

FIGS. 11A and 11B are diagrams showing some specific example implementations of elastically-deformable disk-like flexure elements 1114 and 1140, such as may be utilized in a stylus suspension portion for enabling axial and rotary motion. An example of a material for the flexure elements is phosphor bronze, although it will be appreciated that in other implementations other materials may be utilized. In one implementation, the first flexure element 1114 may be identical with a paired first flexure element (e.g., similar to the flexure elements 414 and 415), while in other implementations a pair of first flexure elements may be different from each other.

The first flexure element 1114 is provided with three cutout portions 1114D that are offset from one another by 120 degrees in the circumferential direction, to form a peripheral portion 1114A, a joining portion 1114B, and a central portion 1114C. The peripheral portion 1114A is an outermost peripheral portion to be fixed to a corresponding element (e.g., a ring portion of the rotating member 436). Opposite ends of the joining portion 1114B are coupled to the peripheral portion 1114A and the central portion 1114C, respectively. The central portion 1114C is a portion to be fixed to a corresponding element (e.g., moving member 412). Displacement of an attached element (e.g., moving member 412) in an axial (or Z) direction causes the central portion 1114C to move normal to the plane of the flexure element 1114 (e.g., the axial direction). It will be appreciated that in other implementations other shapes may be utilized for the flexure elements.

In the implementation of FIG. 11B, the second flexure element 1140 is provided with two arc-shaped cutout portions 1140E offset from each other by 180 degrees in the circumferential direction, and two hinge portions 1140C are formed therebetween. Two arc-shaped cutout portions 1140F offset from each other by 180 degrees in the circumferential direction are further provided on a radially inner side of the cutout portions 1140E and two hinge portions 1140D are formed therebetween. Thereby, a peripheral portion 1140A, a joining portion 1140G, and a central portion 1140B are formed. The peripheral portion 1140A is a portion to be fixed to a respective element (e.g., the main body frame 408). The central portion 1140B is a portion to be fixed to a respective element (e.g., the middle of the cylindrical portion 436C of the rotating member 436). The cutout portions 1140E and 1140F and the resulting hinges are offset from each other by 90 degrees. Thus, the central portion 1140B is tiltable (rotatable) about these hinges with the center of the second flexure element 1140 used as a rotation center RC. It will be appreciated that in other implementations other shapes may be utilized for each of the flexure elements.

Figure 12:
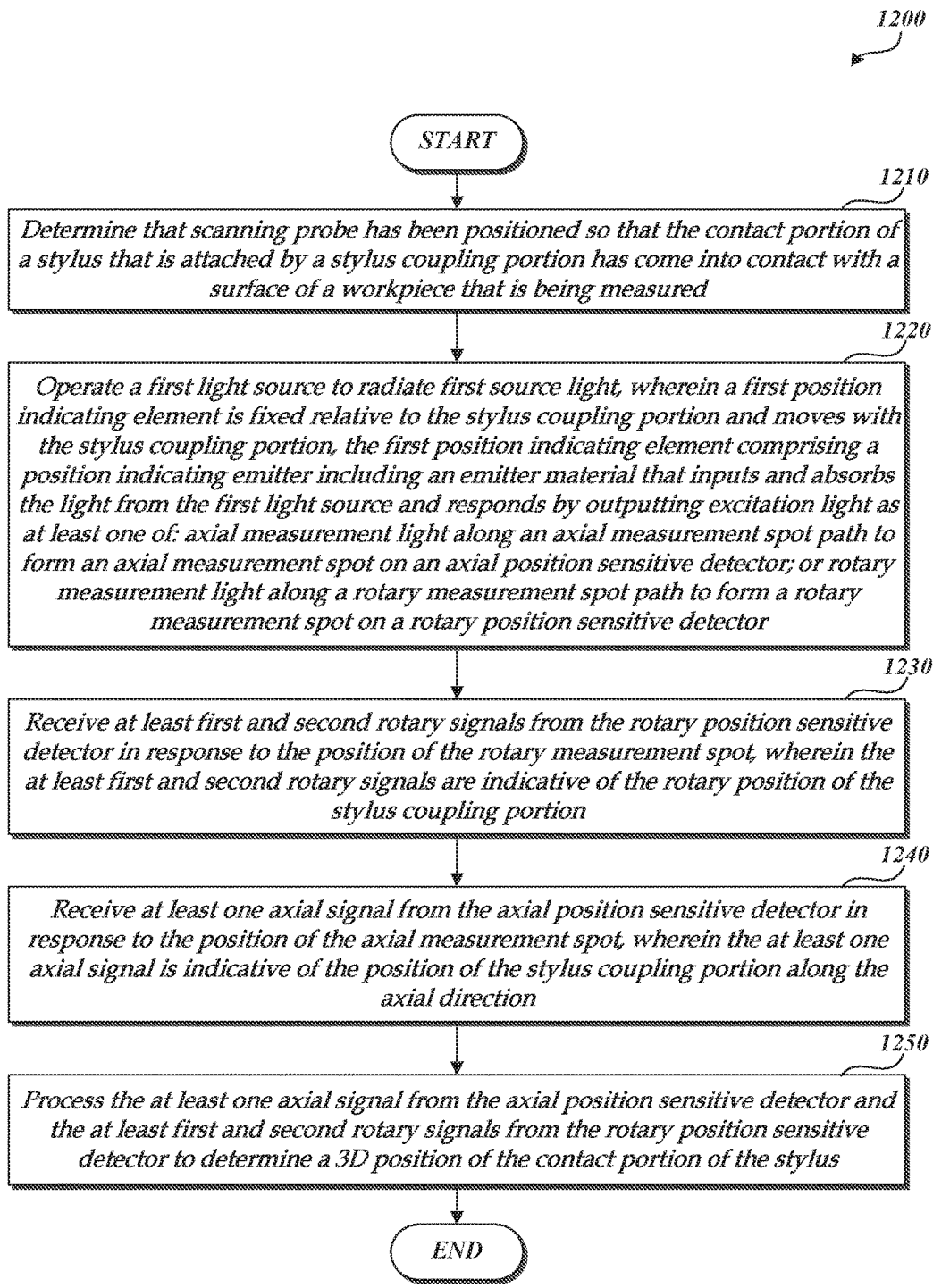
FIG. 12 is a flow diagram illustrating one exemplary implementation of a routine for determining a 3D position of a contact portion of a stylus based on position signals received from a scanning probe.

FIG. 12 is a flow diagram illustrating one exemplary implementation of a routine 1200 for determining a 3D position of a contact portion of a stylus based on position signals received from a scanning probe. At a block 1210, a determination is made that the scanning probe has been positioned so that the contact portion of a stylus that is attached by a stylus coupling portion has come into contact with a surface of a workpiece that is being measured. At a block 1220, a first light source is operated to radiate first source light. A first position indicating element is fixed relative to the stylus coupling portion and moves with the stylus coupling portion, and comprises a position indicating emitter including an emitter material that inputs and absorbs the light from the first light source and responds by outputting excitation light. The excitation light is provided as at least one of: axial measurement light along an axial measurement spot path to form an axial measurement spot on an axial position sensitive detector; or rotary measurement light along a rotary measurement spot path to form a rotary measurement spot on a rotary position sensitive detector.

At a block 1230, at least first and second rotary signals are received from the rotary position sensitive detector in response to the position of the rotary measurement spot, wherein the at least first and second rotary signals are indicative of the rotary position of the stylus coupling portion. At a block 1240, at least one axial signal is received from the axial position sensitive detector in response to the position of the axial measurement spot, wherein the at least one axial signal is indicative of the position of the stylus coupling portion along the axial direction. At a block 1250, the at least one axial signal from the axial position sensitive detector and the at least first and second rotary signals from the rotary position sensitive detector are processed to determine a 3D position of the contact portion of the stylus.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A scanning probe for a coordinate measuring machine, the scanning probe comprising:
   a frame;
   a stylus suspension portion that is attached to the frame, comprising:
      a stylus coupling portion that is configured to be rigidly coupled to a stylus; and
      a stylus motion mechanism that is configured to enable axial motion of the stylus coupling portion along an axial direction, and rotary motion of the stylus coupling portion about a rotation center; and
   a stylus position detection portion, comprising:
      a first position sensitive detector which is fixed relative to the frame and which comprises a first photodetector configured to provide an output that is responsive to the position of a first measurement spot along a first sensing axis direction of the first position sensitive detector, wherein the first position sensitive detector is at least one of an axial position sensitive detector or a rotary position sensitive detector;
      a first light source that is fixed relative to the frame and configured to radiate first source light comprising a first wavelength range along a first source light path; and
      a first position indicating element which is fixed relative to the stylus coupling portion and moves with the stylus coupling portion, the first position indicating element comprising a first position indicating emitter including an emitter material that inputs the light in the first wavelength range from the first light source and responds by outputting excitation light generated within the emitter material, the generated excitation light comprising a second wavelength range not included in the first wavelength range, wherein the first position indicating emitter is configured to input the first source light along the first source light path regardless of the position of the stylus coupling portion within its motion range, and to output the generated excitation light as first measurement light along a first measurement spot path to form a first measurement spot on the first position sensitive detector, and wherein the first position sensitive detector outputs a first signal in response to the first measurement spot, and the first signal is indicative of at least one of an axial or rotary position of the stylus coupling portion.

2. The scanning probe of claim 1, wherein:
the first position sensitive detector is an axial position sensitive detector;
the first measurement spot is an axial measurement spot;
the first signal is an axial signal that is indicative of an axial position of the stylus coupling portion; and
the stylus position detection portion further comprises:
a second position sensitive detector that is a rotary position sensitive detector, wherein the second position sensitive detector is fixed relative to the frame and comprises a second photodetector configured to provide an output that is responsive to a position of a second measurement spot along first and second sensing axis directions of the second position sensitive detector; and
wherein the second measurement spot is a rotary measurement spot that moves along the first and second sensing axis directions of the second position sensitive detector corresponding to a rotary position of the stylus coupling portion, and the second position sensitive detector outputs at least first and second signals in response to the second measurement spot, and the at least first and second signals are indicative of the rotary position of the stylus coupling portion.

3. The scanning probe of claim 2, wherein the first position indicating emitter is further configured to output the generated excitation light as second measurement light along a second measurement spot path to form the second measurement spot on the second position sensitive detector.

4. The scanning probe of claim 2, wherein the stylus position detection portion further comprises a second position indicating element which is fixed relative to the stylus coupling portion and moves with the stylus coupling portion, the second position indicating element comprising a second position indicating emitter including an emitter material that inputs the light in the first wavelength range from the first light source and responds by outputting excitation light generated within the emitter material, the generated excitation light comprising a second wavelength range not included in the first wavelength range, wherein the second position indicating emitter is configured to input the first source light and to output the generated excitation light as second measurement light along a second measurement spot path to form the second measurement spot on the second position sensitive detector.

5. The scanning probe of claim 4, wherein the stylus position detection portion further comprises a beamsplitter that directs a first portion of the first source light toward the first position indicating emitter and directs a second portion of the first source light toward the second position indicating emitter.

6. The scanning probe of claim 2, further comprising a second light source that is fixed relative to the frame and configured to radiate second source light comprising a first wavelength range along a second source light path, and wherein the stylus position detection portion further comprises a second position indicating element which is fixed relative to the stylus coupling portion and moves with the stylus coupling portion, the second position indicating element comprising a second position indicating emitter including an emitter material that inputs the second source light in the first wavelength range from the second light source and responds by outputting excitation light generated within the emitter material, the generated excitation light comprising the second wavelength range not included in the first wavelength range, wherein the second position indicating emitter is configured to input the second source light and to output the generated excitation light as second measurement light along a second measurement spot path to form the second measurement spot on the second position sensitive detector.

7. The scanning probe of claim 2, wherein the signal from the first position sensitive detector in combination with the signals from the second position sensitive detector enables determination of an absolute 3D position of the stylus coupling portion relative to the frame.

8. The scanning probe of claim 2, wherein the first photodetector comprises a first surface area that is oriented in a first surface plane to receive the first measurement light, and the second photodetector comprises a second surface area that is oriented in a second surface plane to receive the second measurement light, and the first and second surface planes are at least one of approximately parallel or coplanar.

9. The scanning probe of claim 1, wherein:
the first position sensitive detector is a rotary position sensitive detector;
the first photodetector is also configured to provide a second signal that is responsive to the position of the first measurement spot along a second sensing axis direction of the first position sensitive detector, wherein the first and second signals are indicative of a rotary position of the stylus coupling portion;
the first measurement spot moves along the first and second sensing axis directions of the first position sensitive detector corresponding to the rotary position of the stylus coupling portion and the associated position of the first position indicating element transverse to the axial direction, and the first position sensitive detector outputs at least the first and second signals in response to the first measurement spot, and the at least first and second signals are indicative of the rotary position of the stylus coupling portion; and
the stylus position detection portion further comprises:
a second position sensitive detector which is fixed relative to the frame and which comprises a second photodetector configured to provide an output that is responsive to the position of a measurement spot along a sensing axis direction of the second position sensitive detector, wherein the second position sensitive detector is an axial position sensitive detector; and
a second position indicating element which is fixed relative to the stylus coupling portion and moves with the stylus coupling portion, the second position indicating element configured to input second source light along the second source light path regardless of the position of the stylus coupling portion within its motion range, and to output second measurement light along a second measurement spot path to form a measurement spot on the second position sensitive detector;

wherein the measurement spot on the second position sensitive detector moves along the sensing axis direction of the second position sensitive detector corresponding to the position of the stylus coupling portion along the axial direction, and the second position sensitive detector outputs at least one signal in response to the measurement spot, and the at least one signal is indicative of the position of the motion element along the axial direction.

10. The scanning probe of claim 1, further comprising:
a second light source that is fixed relative to the frame and configured to radiate second source light comprising a first wavelength range along a second source light path, and wherein the stylus position detection portion further comprises a second position indicating element which is fixed relative to the stylus coupling portion and moves with the stylus coupling portion, the second position indicating element comprising a second position indicating emitter including an emitter material that inputs the second source light in the first wavelength range from the second light source and responds by outputting excitation light generated within the emitter material, the generated excitation light comprising the second wavelength range not included in the first wavelength range, wherein the second position indicating emitter is configured to input the second source light and to output the generated excitation light as second measurement light along a second measurement spot path to form a second measurement spot on the first position sensitive detector; and multiplexing signal processing and control circuitry that is configured to control a timing of the first and second light sources to multiplex the first and second measurement spots onto the first position sensitive detector, and to provide demultiplexing to separate the output signals from the first position sensitive detector corresponding to the first and second measurement spots.

11. The scanning probe of claim 1, wherein the emitter material comprises at least one of phosphor material, photoluminescent semiconductor nanoparticles, nanocrystals, quantum dots, or nanorods.

12. The scanning probe of claim 1, wherein the stylus position detection portion further comprises a first lens configured to input the first measurement light and to focus the first measurement light to form the first measurement spot on the first position sensitive detector.

13. The scanning probe of claim 12, wherein the stylus position detection portion further comprises a first aperture located between the first detector lens and the first position sensitive detector, and the first aperture is configured to spatially filter the first measurement light from the first detector lens.

14. The scanning probe of claim 12, wherein the first detector lens is a gradient index lens.

15. The scanning probe of claim 1, wherein the stylus position detection portion further comprises a first optical filter that is located in the first measurement spot path and that is configured to block the first source light in the first wavelength range from reaching the first position sensitive detector and to allow the first measurement light in the second wavelength range to pass through to reach the first position sensitive detector.

16. The scanning probe of claim 15, wherein the first optical filter is a high pass optical filter.

17. The scanning probe of claim 15, wherein the first optical filter is part of either the first position indicating element or the first position sensitive detector.

18. The scanning probe of claim 1, wherein the stylus position detection portion further comprises a beamsplitter that is located in the first source light path and that allows the first source light in the first wavelength range to pass through to reach the first position indicating emitter, and that is located in the first measurement spot path and that includes a reflective surface that directs the first measurement light toward the first position sensitive detector.

19. The scanning probe of claim 18, wherein the beamsplitter is a dichroic beamsplitter.

20. The scanning probe of claim 1, wherein the first light source is operated in a pulsed mode to avoid quenching the emitter material.

21. A scanning probe for a coordinate measuring machine, the scanning probe comprising:
a frame;
a stylus suspension portion that is attached to the frame, comprising:
a stylus coupling portion that is configured to be rigidly coupled to a stylus; and
a stylus motion mechanism that is configured to enable axial motion of the stylus coupling portion along an axial direction, and rotary motion of the stylus coupling portion about a rotation center; and
a stylus position detection portion, comprising:
an axial position sensitive detector which is fixed relative to the frame and which comprises an axial photodetector configured to provide an output that is responsive to the position of a measurement spot along a sensing axis direction of the axial position sensitive detector, and
a rotary position sensitive detector which is fixed relative to the frame and which comprises a rotary photodetector configured to provide an output that is responsive to the position of a measurement spot along first and second sensing axis directions of the rotary position sensitive detector;
an axial measurement spot generating configuration comprising:
an axial light source that is fixed relative to the frame and configured to radiate axial source light along an axial source light path; and
an axial position indicating element which is fixed relative to the stylus coupling portion and moves with the stylus coupling portion, the axial position indicating element configured to input the axial source light along the axial source light path regardless of the position of the stylus coupling portion within its motion range, and to output axial measurement light along an axial measurement spot path to form an axial measurement spot on the axial position sensitive detector;
wherein the axial measurement spot moves along the sensing axis direction of the axial position sensitive detector corresponding to the position of the stylus coupling portion along the axial direction, and the axial position sensitive detector outputs at least one axial signal in response to the axial measurement spot, and the at least one axial signal is indicative of the axial position of the stylus coupling portion; and a rotary measurement spot generating configuration comprising:
- a rotary light source that is fixed relative to the frame and configured to radiate rotary source light along a rotary source light path; and
- a rotary position indicating element which is fixed relative to the stylus coupling portion and moves with the stylus coupling portion, the rotary position indicating element configured to input the rotary source light along the rotary source light path regardless of the position of the stylus coupling portion within its motion range, and to output rotary measurement light along a rotary measurement spot path to form an rotary measurement spot on the rotary position sensitive detector;
- wherein the rotary measurement spot moves along the first and second sensing axis directions of the rotary position sensitive detector corresponding to the rotary position of the stylus coupling portion and the associated position of the rotary position indicating element transverse to the axial direction, and the rotary position sensitive detector outputs at least first and second rotary signals in response to the rotary measurement spot, and the at least first and second rotary signals are indicative of the rotary position of the stylus coupling portion, wherein:
- at least one of the axial measurement spot generating configuration or the rotary measurement spot generating configuration comprises an emitter material configuration, wherein:
  - its respective light source radiates source light comprising a first wavelength range along its respective source light path; and
  - its respective position indicating element includes a respective position indicating emitter comprising an emitter material that inputs and absorbs the light in the first wavelength range and responds by outputting excitation light generated within the emitter material, the generated excitation light comprising a second wavelength range not included in the first wavelength range, and the generated excitation light output as measurement light along its respective measurement spot path to form a respective measurement spot on its respective position sensitive detector.

22. The scanning probe of claim 21, wherein both the axial measurement spot generating configuration and the rotary measurement spot generating configuration comprise the emitter material configuration.

23. The scanning probe of claim 22, wherein the axial position indicating element and the rotary position indicating element comprise the same, single, position indicating element.

24. The scanning probe of claim 23, wherein the axial light source and the rotary light source comprise the same, single, light source.

25. The scanning probe of claim 21, further comprising a beamsplitting element fixed to the stylus motion mechanism, wherein the position indicating emitter comprises an axial portion of excitation material and a rotary portion of excitation material fixed to different portions of the beamsplitting element.

26. A system for determining a 3D position of a contact portion of a stylus based on position signals received from a scanning probe the stylus is coupled to, the system comprising:
a scanning probe comprising:
  a frame;
  a stylus suspension portion that is attached to the frame, comprising:
    a stylus coupling portion that is configured to be rigidly coupled to a stylus; and
    a stylus motion mechanism that is configured to enable axial motion of the stylus coupling portion along an axial direction, and rotary motion of the stylus coupling portion about a rotation center; and
  a stylus position detection portion, comprising:
    an axial position sensitive detector which is fixed relative to the frame and which comprises an axial photodetector configured to output at least one axial signal that is responsive to the position of an axial measurement spot along a sensing axis direction of the axial position sensitive detector, wherein the axial measurement spot moves along the sensing axis direction of the axial position sensitive detector corresponding to the position of the stylus coupling portion along the axial direction, and the axial position sensitive detector outputs the at least one axial signal in response to the axial measurement spot, and the at least one axial signal is indicative of the position of the stylus coupling portion along the axial direction, and
    a rotary position sensitive detector which is fixed relative to the frame and which comprises a rotary photodetector configured to output at least first and second rotary signals that are responsive to the position of a rotary measurement spot along first and second sensing axis directions of the rotary position sensitive detector, wherein the rotary measurement spot moves along the first and second sensing axis directions of the rotary position sensitive detector corresponding to the rotary position of the stylus coupling portion, and the rotary position sensitive detector outputs the at least first and second rotary signals in response to the rotary measurement spot, and the at least first and second rotary signals are indicative of the rotary position of the stylus coupling portion;
  a first light source that is fixed relative to the frame and configured to radiate first source light comprising a first wavelength range along a first source light path; and
  a first position indicating element which is fixed relative to the stylus coupling portion and moves with the stylus coupling portion, the first position indicating element comprising a position indicating emitter including an emitter material that inputs and absorbs the light from the first light source in the first wavelength range and responds by outputting excitation light generated within the emitter material, the generated excitation light comprising a second wavelength range not included in the first wavelength range, wherein the position indicating emitter is configured to input the first source light along the first source light path regardless of the position of the stylus coupling portion within its motion range, and to output the generated excitation light as at least one of:

axial measurement light along an axial measurement spot path to form the axial measurement spot on the axial position sensitive detector; or rotary measurement light along a rotary measurement spot path to form the rotary measurement spot on the rotary position sensitive detector; and a processing portion that processes the at least one axial signal from the axial position sensitive detector and the at least first and second rotary signals from the rotary position sensitive detector to determine a 3D position of the contact portion of the stylus.

* * * * *